United States Patent
Ruprich et al.

(10) Patent No.: US 7,542,726 B2
(45) Date of Patent: Jun. 2, 2009

(54) METHODS AND APPARATUSES FOR DETECTING THE TX DIVERSITY MODE FOR MOBILE RADIO RECEIVERS

(75) Inventors: Thomas Ruprich, München (DE); Steffen Paul, Baierbrunn (DE)

(73) Assignee: Infineon Technologies AG (DE)

( * ) Notice: Subject to any disclaimer, the term of this patent is extended or adjusted under 35 U.S.C. 154(b) by 707 days.

(21) Appl. No.: 11/119,483

(22) Filed: Apr. 29, 2005

(65) Prior Publication Data

US 2005/0260950 A1    Nov. 24, 2005

Related U.S. Application Data

(63) Continuation of application No. PCT/DE03/03553, filed on Oct. 24, 2003.

(30) Foreign Application Priority Data

Oct. 31, 2002    (DE) ................. 102 50 861

(51) Int. Cl.
*H04B 1/00* (2006.01)
(52) U.S. Cl. ............. 455/70; 455/101; 455/140; 455/552.1; 375/148; 375/347; 370/335; 370/342; 370/204; 370/215
(58) Field of Classification Search .......... 455/70, 455/101, 140, 552.1; 375/148, 347; 370/335, 370/342, 204, 215
See application file for complete search history.

(56) References Cited

U.S. PATENT DOCUMENTS

| | | | | |
|---|---|---|---|---|
| 6,728,302 B1 * | 4/2004 | Dabak et al. | ................. | 375/148 |
| 6,804,311 B1 * | 10/2004 | Dabak et al. | ................. | 375/347 |
| 6,934,245 B2 * | 8/2005 | Kwak et al. | ................. | 370/204 |
| 7,095,727 B2 * | 8/2006 | Kim et al. | ................. | 370/335 |
| 2002/0060996 A1 | 5/2002 | Kwak et al. | ................. | 370/335 |

FOREIGN PATENT DOCUMENTS

| EP | 1 056 237 A2 | 11/2000 |
|---|---|---|
| EP | 1 113 615 A2 | 7/2001 |

OTHER PUBLICATIONS

"Possibility to use STTD on PCCPCH"; TSG-RAN Working Group 1 meeting #2; Yokohama 22-25, Feb. 1999.
"An Alternative Scheme to Detect the STTD Encoding of PCCPCH"; TSG-RAN WGI meeting #3; Nynashamm, Sweden 22-26, Mar. 1999.
"Fast Reliable Detecting of STTD Encoding of PCCPCH with no L3 Messaging Overhead"; TSG-Ran WGI meeting #4; Yokohama Japan 18-20, Apr. 1999.
Release 4; 3GPP TS 25.211 V4.3.0; pp. 24-26, Dec. 2001.
Zoch, et al.; "Cell Search Performance Analysis for W-CDMA*"; Dresden, Germany.
Holma, Harri et al.; WCDMA for UMTS 1st Edition, pp. 113-114, 1998.
Dabak, A.G. et al., "A comparison of the open loop transmit diversity schemes for third generation wireless systems"; Proceedings of IEEE Conference on Wireless communication and Networking WCNC; vol. 1; pp. 437-442, Sep. 2000.
Toskala A. et al., "ETSI WCDMA for UMTS"; IEEE 5th International Symposium on Spread Spectrum Techniques and Applications—Proceedings; pp. 616-620, 1988.

* cited by examiner

*Primary Examiner*—Sanh D Phu
(74) *Attorney, Agent, or Firm*—Dickstein, Shapiro, LLP.

(57) ABSTRACT

In a method and an apparatus (1) for transmission diversity mode detection in a mobile radio receiver using a decision function, the decision function which is used for detection of the transmission diversity mode is based on the coherent processing of two successive input signal data tuples {r(k); r(k+1)} and {r(k+2);r(k+3)} and recording of a phase offset between the two tuples.

32 Claims, 8 Drawing Sheets

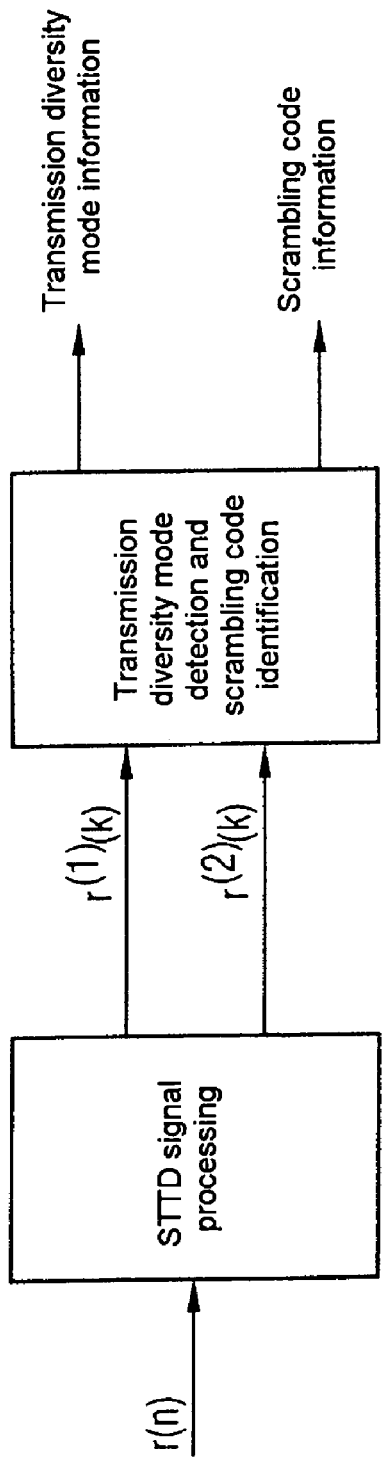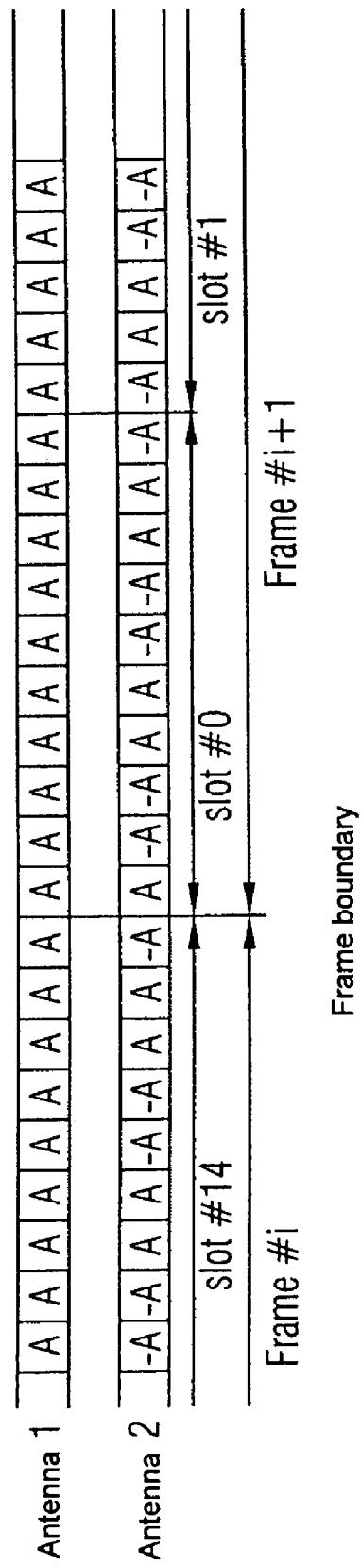

METHODS AND APPARATUSES FOR DETECTING THE TX DIVERSITY MODE FOR MOBILE RADIO RECEIVERS

CROSS-REFERENCE TO RELATED APPLICATION

This application is a continuation of copending International Application No. PCT/DE03/03553 filed Oct. 24, 2003 which designates the United States, and claims priority to German application no. 102 50 861.5 filed Oct. 31, 2002.

TECHNICAL FIELD OF THE INVENTION

The present invention relates to methods and apparatuses for transmission diversity mode detection using blind detection of a second transmitting antenna by means of pilot sequences for mobile radio receivers. The present invention furthermore relates to mobile radio receivers in which these methods and apparatuses are used.

DESCRIPTION OF RELATED ART AND BACKGROUND OF THE INVENTION

In every mobile radio receiver, the transmission and reception clocks must be synchronized before a data link is set up to one or more base stations. This is generally achieved by means of a three-stage method, in which the mobile radio receiver is synchronized to the slot and frame boundaries of the corresponding base station, and identifies the scrambling codes used. In accordance with the 3rd generation mobile radio system standards, such as 3GPP TS 25.211 V4.3.0 (2001-12), base stations can in general be operated in a so-called "transmission diversity mode" (also referred to as a "TX diversity mode"). In this case, the transmission signal is emitted from two different antennas and, by way of example, is modulated on one of the two antennas with a specific signal sequence, so that the two transmission signal streams are transmitted orthogonally with respect to one another in time.

Transmission diversity methods can significantly improve the performance by appropriate demodulation when the data is received at the mobile terminal. For this purpose, it is, however, necessary for the terminal to know that a transmission diversity method is being used and what transmission diversity method is being used, since, otherwise, this would result in additional performance degradation. In consequence, it is desirable that the transmission diversity mode be detected as reliably as possible at as early a time as possible, in order to ensure efficient data reception.

In principle, three different approaches are known from the prior art for solving the detection problem.

A) By means of layer 3 signaling (in this context, see the paper "An alternative scheme to detect the STTD encoding of PCCPCH" by Texas Instruments in TSG-RAN WG1 meeting #3, Nynasham (Sweden), 22 to 26 Mar. 1999, page 150 et seq.), B) Detection of an indicator sequence which is modulated onto the synchronization channel on a symbol basis (in this context, see the paper "Fast reliable detection of STTD encoding of PCCPCH with no L3 messaging overhead" by Texas Instruments in TSG-RAN WG1 meeting #4, Yokohama (Japan), 18 to 20 Apr. 1999, page 372 et seq.), C) Blind detection of the second transmission antenna by means of pilot sequences for example CPICH (CPICH=Common Pilot Channel) (in this context, see the paper "STTD encoding for PCCPCH" by Texas Instruments in TSG-RAN Working Group 1 meeting #2, Yokohama, 22 to 25 Feb. 1999, page 83 et seq.).

In the methods according to A) and B) frequency synchronization by means of AFC and knowledge about the transmission channel (carrying out a channel estimation process based, for example, on the assumption that the transmission diversity mode is being used) is a precondition for obtaining any detection results at all, or at least acceptable detection results. In particular, this involves additional processing time, which is in general at the expense of the overall performance of the synchronization procedure.

The approaches according to A) and B) can thus not be used on a general basis.

In principle, methods according to C) can be carried out by means of incoherent detection methods and, within a specific frame, thus do not require frequency synchronization and/or channel information, either. However, a considerable performance degradation is observed for frequency errors of more than 1 kHz with known methods. With a frequency error of about 1.9 ppm (approximately 4 kHz), conventional approaches based on C) would detect a second transmission antenna although the transmission process is being carried out via only one transmission antenna. The diagram illustrated in FIG. 2 shows the degradation behavior of these approaches as a function of the frequency error. This has been based on the transmission diversity modulation method (which is used in the UMTS system) for the CPICH signal (STTD—Space Time Transmit Diversity) with the sequences described on pages 24 to 26 of the 3GPP TS 25.211 V4.3.0 (2001-12) Standard.

In this case, the curve "Antenna$_{(n,m)}^{(xppm)}$" in the upper diagram in FIG. 2 shows the energy component of the antenna n in the decision function for the antenna m for a frequency error of x ppm.

In order to make the method of operation and advantages of the method according to the invention (which will be described further below) clear, the method procedure for conventional transmission detection approaches based on C) will be described first of all in the following text, emphasizing the disadvantages which result from it. This is because the present invention builds on the idea on which C) is based, but extending this in such a way that a "transmission diversity mode" detection apparatus designed on the basis of this method is very robust with respect to frequency errors and channel phases.

The detection method in this case uses the characteristics of the CPICH signal, which differ depending on the transmission mode being used (transmission diversity on/off), see 3GPP TS 25.211 V4.3.0 (2001-12), for examples pages 24 to 26 of this document. When the transmission diversity mode is switched on, a modulation sequence is in each case "applied" in symbols to the transmission signal at the antenna 1 and to the transmission signal at the antenna 2, with these sequences being orthogonal with respect to one another and having a minimum length of two symbols. In this context, FIG. 3 shows an STTD sequence for the CPICH.

First of all, a list will be provided at this point of the symbols and variables which are used frequently in the following text:

$r(n)$ received complex data sample relating to the sampling time n, $r_x^{(a)}(k)$ received and STTD-demodulated complex data sample for the x-th received data tuple relating to the sampling time k for the antenna a, $\hat{r}_x^{(a)}$ received STTD-demodulated and phase-corrected complex data sample for the x-th received data tuple for the antenna a, $s_a(n)$ complex data sample, transmitted via the antenna a, relating to the sampling time n, $A_n^{(a)}$ n-th sample of the STTD-modulation sequence for the antenna a, $y_x$ decision variable relating to the x-th received data tuple, $y^{(a)}$ decision variable relating to the antenna a, arg b phase angle of the complex number b, sig{.} mathematical sign function, and $\sigma^2$ symbol energy on the assumption that the channel has the transfer function unity for both antennas.

On the simplified assumption that the channel has the transfer function unity for both antennas and that the frequency error of the terminal crystal is negligible, the received signal at symbol level is given by:

$$r(n) = A_n^{(1)} s_1(n) + A_n^{(2)} s_2(n) + n_0(n) \quad \text{equation 1}$$

Both the symbols $s(n)=s_1(n)=s_2(n)$ and the sequences $A_n^{(1)}$ and $A_n^{(2)}$ are generally known at the receiver end. Coherent processing of symbol tuples $\{r(k); r(k+1)\}$ where k=2n must be carried out at the receiver end in order to detect the two antenna signals. Thus:

Signal from antenna 1:

$$r^{(1)}(k) = r(k) \cdot A_k^{(1)} s^*(k) + r(k+1) \cdot A_{k+1}^{(1)} s^*(k+1) + n_1(k)$$
$$= (A_k^{(1)} \sigma_{s1}^2 + A_k^{(2)} \sigma_{s2}^2) A_k^{(1)} + (A_{k+1}^{(1)} \sigma_{s1}^2 + A_{k+1}^{(2)} \sigma_{s2}^2) A_{k+1}^{(1)} + n_1(k)$$

and, taking account of the characteristics of the sequences $A_n^{(1)}$ and $A_n^{(2)}$, $$r^{(1)}(k) = 2|A|^2 \sigma_{s1}^2 + 0 \sigma_{s2}^2 + n_1(k) \quad \text{Equation 2}$$

Signal from antenna 2:

$$r^{(2)}(k) = r(k) \cdot A_k^{(2)} s^*(k) + r(k+1) \cdot A_{k+1}^{(2)} s^*(k+1) + n_1(k)$$
$$= (A_k^{(1)} \sigma_{s1}^2 + A_k^{(2)} \sigma_{s2}^2) A_k^{(2)} + (A_{k+1}^{(1)} \sigma_{s1}^2 + A_{k+1}^{(2)} \sigma_{s2}^2) A_{k+1}^{(2)} + n_1(k)$$

and, taking account of the characteristics of the sequences $A_n^{(1)}$ and $A_n^{(2)}$:

$$r^{(2)}(k) = 0 \sigma_{s1}^2 + 2|A|^2 \sigma_{s2}^2 + n_1(k) \quad \text{Equation 3}$$

Using this method, it is possible to detect unambiguously in the idealized conditions above whether a signal is being emitted from the respective antenna and whether the transmission diversity mode is or is not being used. In this context, the magnitude from Equation 2 and Equation 3

$$y^{(1)} = |r^{(1)}(k)| = |2|A|^2 \sigma_{s1}^2 + n_1(k)| \text{ and } y^{(2)} = |r^{(2)}(k)| = |2|A|^2 \sigma_{s2}^2 + n_1(k)|$$

respectively is in general compared with a well-defined threshold value TH. The decision rule is, for example, as follows:

a) $y_1 > TH \ \& \ y_2 \leq TH \rightarrow$ transmission diversity mode is not active b) $y_1 > TH \ \& \ y_2 > TH \rightarrow$ transmission diversity mode is active c) $y_1 \leq TH \ \& \ y_2 \leq TH \rightarrow$ no decision is possible Note: in the situation where no transmission diversity mode is being used, then $\sigma_{s2}^2 = 0$ If a specific frequency error is allowed, then the received image of $s(k+1)$ has a phase shift of $\Delta\phi$ with respect to the received image s(k). This phase difference in each case projects an energy component from the antenna components to be masked out in Equation 2 and Equation 3 into the result function $r^{(1)}(k)$ or $r^{(2)}(k)$, respectively, and additionally attenuates the contribution of the respective antenna to be detected.

On the basis of the above decision criteria in a)-c), the component of the projection of the antenna 1 onto the decision function $y^{(2)}$ as well as the attenuation contribution to the component of the antenna 1 in the decision function $y^{(1)}$ are of interest.

If Equation 2 and Equation 3 are extended in order to take account of any existing frequency error, then this results in the following generalized equations for the decision functions $y^{(1)}$ and $y^{(2)}$:

$$y^{(1)} = |\sqrt{2}\sqrt{1+\cos\Delta\phi}|A|^2 \sigma_{s1}^2 + \sqrt{2}\sqrt{1-\cos\Delta\phi}|A|^2 \sigma_{s2}^2 + n_1(k)| \quad \text{Equation 4}$$

and $$y^{(2)} = |\sqrt{2}\sqrt{1-\cos\Delta\phi}|A|^2 \sigma_{s1}^2 + \sqrt{2}\sqrt{1+\cos\Delta\phi}|A|^2 \sigma_{s2}^2 + n_1(k)|. \quad \text{Equation 5}$$

For a phase angle of $\Delta\phi = \pi/2$, it is evident from Equation 4 and Equation 5 that the projection components each have magnitudes which are equal to the antenna components to be detected. For the above decision rules, this means that (subject to the condition that c) is not satisfied) two antennas (the transmission diversity mode is being used) are always detected, irrespective of the transmission diversity mode that is being used. This situation is illustrated once again in the diagram in FIG. 2.

The statements so far make it clear that the methods which are known from the prior art for detection of the transmission diversity mode have only a restricted performance and a significant degradation of the results must be expected particularly during an initial synchronization phase where considerable frequency errors must be expected.

In order to further illustrate the prior art, FIG. 4 shows a block diagram of an apparatus for detection of the transmission diversity mode according to the prior art.

SUMMARY OF THE INVENTION

Against the background of the methods and apparatuses of this generic type for transmission diversity mode detection, the invention is based on the object of providing such methods and apparatuses for transmission diversity mode detection as well as associated mobile radio receivers which are more robust with respect to frequency errors and channel phases, while nevertheless ensuring very short detection times, than the corresponding transmission diversity mode detection methods, transmission diversity mode detection apparatuses and mobile radio receivers which are known from the prior art.

According to the invention, this object can be achieved by a method for blind detection of the presence of a transmission diversity mode in a mobile radio receiver, wherein a radio transmission from a transmission end in the transmission diversity mode is carried out with spatial diversity by means of two antennas, comprising the step of making a decision as to whether a transmission diversity mode is present on the basis of coherent processing of two successive received input signal data tuples $\{r(k); r(k+1)\}$ and $\{r(k+2); r(k+3)\}$ of a pilot sequence, wherein the first input signal data tuple $\{r(k); r(k+1)\}$ comprises two successive received complex data samples r(k) and r(k+1) relating to the sampling time k and the sampling time k+1 respectively, and the second input signal data tuple $\{r(k+2); r(k+3)\}$ comprises two successive received complex data samples r(k+2) and r(k+3) relating to the sampling time k+2 and the sampling time k+3, respectively.

The decision as to whether a transmission diversity mode is present can also be based on the recording of a phase offset between the two successive input signal data tuples {r(k); r(k+1)} and {r(k+2);r(k+3)}. The received input signal data can be digitally preprocessed for detection of the transmission diversity mode, and the resultant data from the preprocessing can be processed further in parallel both in the course of the identification of a scrambling code that is used for radio transmission and in the course of the detection of the transmission diversity mode. The detection of the transmission diversity mode can be carried out in two series stages, with the first stage digitally processing the received data and making signal components from the individual antennas available to the downstream processing stages, and the second stage evaluating a characteristic variable of the phase angle between the signal components from each of the individual antennas for each tuple, or estimating and correcting the phase angle between the signal component of a specific antenna with respect to the first tuple and the signal component of the same antenna with respect to the second tuple and, based on the phase-corrected tuple pairs, deciding whether a transmission diversity mode is present. The results of the first stage can be at the same time fed both into the second stage and into a processing device for identification of the scrambling code. The characteristic variable can be the mathematical sign. The first method stage can be carried out on one finger of a rake receiver. Sequences of a pilot channel which is known as CPICH in accordance with the UMTS-3GPP Standard can be used as pilot sequences, with the sequences being coded for transmission diversity using a UMTS-3GPP-specific STTD code.

The object can also be achieved by a method for blind detection of the presence of a transmission diversity mode, with a radio transmission from a transmission end in the transmission diversity mode taking place with spatial diversity by means of two antennas, and for scrambling code identification in a mobile radio receiver by means of received pilot sequences, the method comprising the steps of preprocessing a received input signal data digitally for detection of the transmission diversity mode and further processing the resultant data from the preprocessing in parallel both in the course of the identification of a scrambling code which is used for the radio transmission and in the course of the detection of the transmission diversity mode.

The decision as to whether a transmission diversity mode is present can be made on the basis of coherent processing of two successive received input signal data tuples {r(k);r(k+1)} and {r(k+2);r(k+3)} of a pilot sequence, with the first input signal data tuple {r(k);r(k+1)} comprising two successive received complex data samples r(k) and r(k+1) relating to the sampling time k and the sampling time k+1 respectively, and the second input signal data tuple {r(k+2);r(k+3)} comprising two successive received complex data samples r(k+2) and r(k+3) relating to the sampling time k+2 and the sampling time k+3, respectively, and can be based on recording of a phase offset between the two successive input signal data tuples {r(k);r(k+1)} and {r(k+2);r(k+3)}. The detection of the transmission diversity mode can be carried out in two series stages, with the first stage digitally processing the received data and making signal components from the individual antennas available to the downstream processing stages, and the second stage evaluating a characteristic variable of the phase angle between the signal components from each of the individual antennas for each tuple, or estimating and correcting the phase angle between the signal component of a specific antenna with respect to the first tuple and the signal component of the same antenna with respect to the second tuple and, based on the phase-corrected tuple pairs, deciding whether a transmission diversity mode is present. The results of the first stage can be at the same time fed both into the second stage and into a processing device for identification of the scrambling code. The characteristic variable can be the mathematical sign. The first method stage can be carried out on one finger of a rake receiver. Sequences of a pilot channel which is known as CPICH in accordance with the UMTS-3GPP Standard can be used as pilot sequences, with the sequences being coded for transmission diversity using a UMTS-3GPP-specific STTD code.

The object can also be achieved by an apparatus for blind detection of the presence of a transmission diversity mode in a mobile radio receiver, wherein a radio transmission at a transmission end in the transmission diversity mode is carried out with spatial diversity by means of two antennas, comprising a means for coherent processing of two successive input signal data tuples {r(k);r(k+1)} and {r(k+2);r(k+3)} of a pilot sequence, with the first input signal data tuple {r(k);r(k+1)} comprising two successive received complex data samples r(k) and r(k+1) relating to the sampling time k and to the sampling time k+1, respectively, and the second input signal data tuple {r(k+2);r(k+3)} comprising two successive received complex data samples r(k+2) and r(k+3) relating to the sampling time k+2 and the sampling time k+3, respectively, and a means for detection of the transmission diversity mode, which makes the decision as to whether a transmission diversity mode is present as a function of the output signal from the means for coherent processing of two successive input signal data tuples. The apparatus may further comprise a means for detection of the phase offset between the two successive input signal data tuples {r(k);r(k+1)} and {r(k+2); r(k+3)}, with the means for detection of the transmission diversity mode additionally making the decision as to whether a transmission diversity mode is present as a function of the phase offset. The apparatus may also comprise a first stage which digitally preprocesses received input signal data for detection of the transmission diversity mode, a first processing stage, which follows the first stage, for identification of the scrambling code which is used for radio transmission, and receives the resultant data from the first stage, and a second processing stage, which follows the first stage, for detection of the transmission diversity mode, and which receives the resultant data from the first stage. The apparatus may further comprise two series stages in which the detection of the transmission diversity mode is carried out in two serial steps, wherein the first stage being designed such that it digitally processes the received data, and makes signal components of the individual antennas available to the first and second processing stages and the second stage being designed such that it evaluates a characteristic variable of the phase angle between the signal components of each of the individual antennas for each tuple, or estimates and corrects the phase angle between the signal component of a specific antenna with respect to the first tuple and the signal component of that antenna with respect to the second tuple and, based on the phase-corrected tuple pairs, makes the decision as to whether a transmission diversity mode is present. The results of the first transmission diversity mode detection stage can be at the same time fed both into a second transmission diversity mode detection stage and into the first processing device for identification of the scrambling code, with both the second transmission diversity mode detection stage and the processing device for identification of the scrambling code being part of the second series stage. The characteristic variable can be the mathematical sign. One finger of a rake receiver may act as a first stage. Sequences of a pilot channel, which is known as the CPICH, can be used as pilot sequences in accordance with the UMTS-3GPP Standard, with the sequences being coded with a UMTS-3GPP-specific STTD code for transmission diversity. A mobile radio receiver may comprise such an apparatus, wherein the receiver can be a CDMA mobile radio receiver.

The object can furthermore be achieved by an apparatus for blind detection of the presence of a transmission diversity mode, wherein a radio transmission at a transmission end in the transmission diversity mode is carried out with spatial diversity by means of two antennas, and for scrambling code identification in a mobile radio receiver by means of pilot sequences, comprising a first stage which digitally preprocesses received input signal data for detection of the transmission diversity mode, a first processing stage, which follows the first stage, for identification of the scrambling code which is used for the radio transmission, and which receives the resultant data from the first stage, and a second processing stage, which follows the first stage, for detection of the transmission diversity mode, and receives the resultant data from the first stage.

The apparatus may further comprise a means for coherent processing of two successive input signal data tuples $\{r(k); r(k+1)\}$ and $\{r(k+2); r(k+3)\}$ of a pilot sequence, with the first input signal data tuple $\{r(k); r(k+1)\}$ comprising two successive received complex data samples $r(k)$ and $r(k+1)$ relating to the sampling time k and to the sampling time k+1, respectively, and the second input signal data tuple $\{r(k+2); r(k+3)\}$ comprising two successive received complex data samples $r(k+2)$ and $r(k+3)$ relating to the sampling time k+2 and the sampling time k+3, respectively, a means for recording of the phase offset between the two successive input signal data tuples $\{r(k); r(k+1)\}$ and $\{r(k+2); r(k+3)\}$, and a means for detection of the transmission diversity mode, which makes the decision as to whether a transmission diversity mode is present as a function of the output signal from the means for coherent processing of two successive input signal data tuples and furthermore as a function of the recorded phase offset. The apparatus may further comprise two series stages in which the detection of the transmission diversity mode is carried out in two serial steps, wherein the first stage being designed such that it digitally processes the received data, and makes signal components of the individual antennas available to the first and second processing stages and the second stage being designed such that it evaluates a characteristic variable of the phase angle between the signal components of each of the individual antennas for each tuple, or estimates and corrects the phase angle between the signal component of a specific antenna with respect to the first tuple and the signal component of that antenna with respect to the second tuple and, based on the phase-corrected tuple pairs, makes the decision as to whether a transmission diversity mode is present. The results of the first transmission diversity mode detection stage can be at the same time fed both into a second transmission diversity mode detection stage and into the first processing device for identification of the scrambling code, with both the second transmission diversity mode detection stage and the first processing device for identification of the scrambling code being part of the second series stage. The characteristic variable can be the mathematical sign. One finger of a rake receiver may act as a first stage. Sequences of a pilot channel, which is known as the CPICH, can be used as pilot sequences in accordance with the UMTS-3GPP Standard, with the sequences being coded with a UMTS-3GPP-specific STTD code for transmission diversity. A mobile radio receiver may comprise such an apparatus, wherein the receiver can be a CDMA mobile radio receiver.

The method according to the invention allows the transmission diversity mode to be detected during the scrambling code identification, and is thus a component of the synchronization process. This results in a significant time saving in comparison to the overall time which is required for complete matching between a mobile radio receiver and a base station. Furthermore, all of the methods, apparatuses and mobile radio receivers according to the invention are very robust with respect to frequency errors, while nevertheless at the same time achieving short detection times.

BRIEF DESCRIPTION OF THE DRAWINGS

Exemplary embodiments of the invention will be explained in the following text with reference to figures, in which:

FIG. 1 shows an outline block diagram of one exemplary embodiment of a method according to the invention, FIG. 3 shows the STTD sequence for the CPICH.

DETAILED DESCRIPTION OF THE EMBODIMENTS

Figure 2:
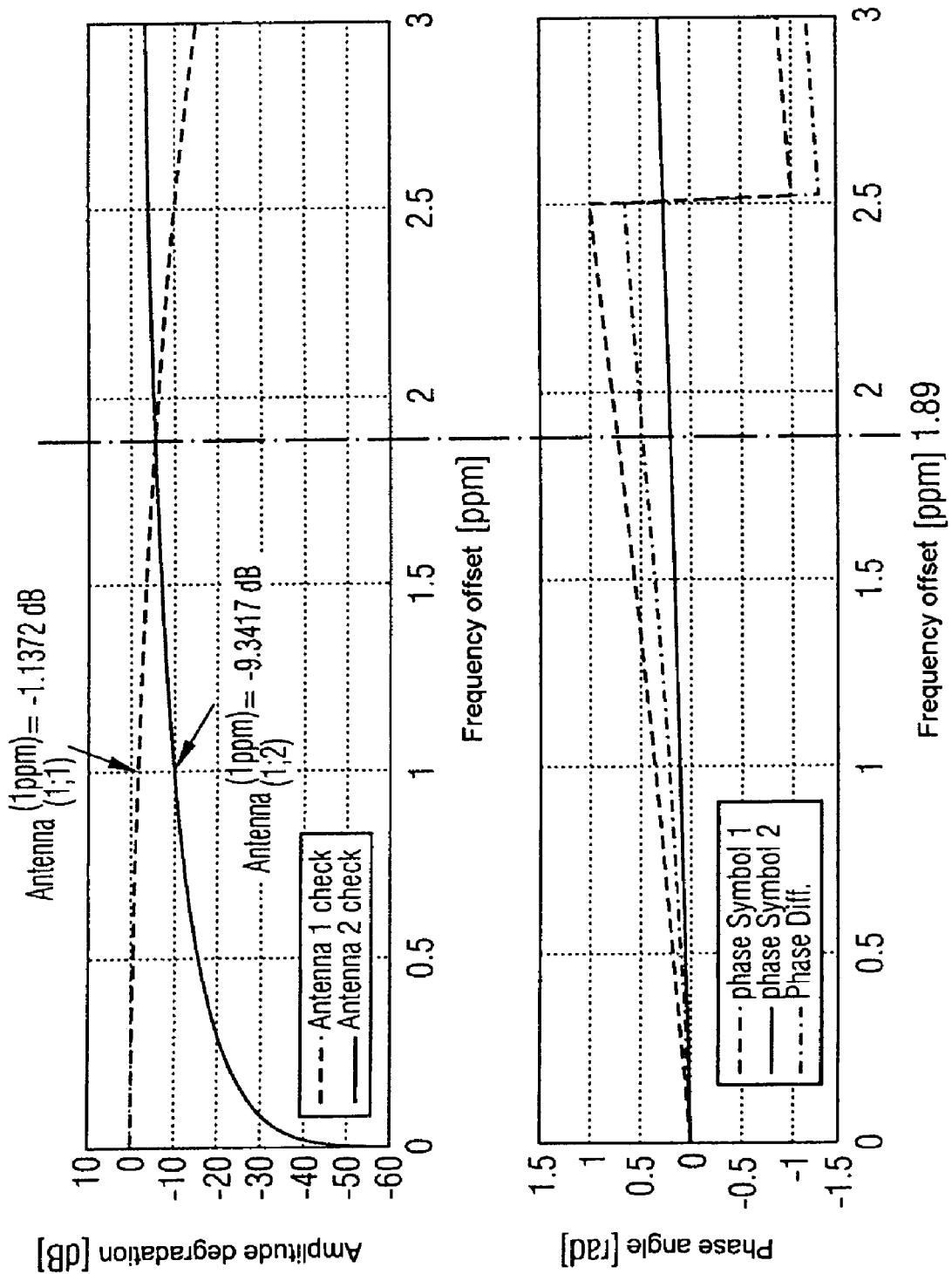
FIG. 2 shows a magnitude and phase diagram for the antenna contribution and the projection contribution.
Figure 4:
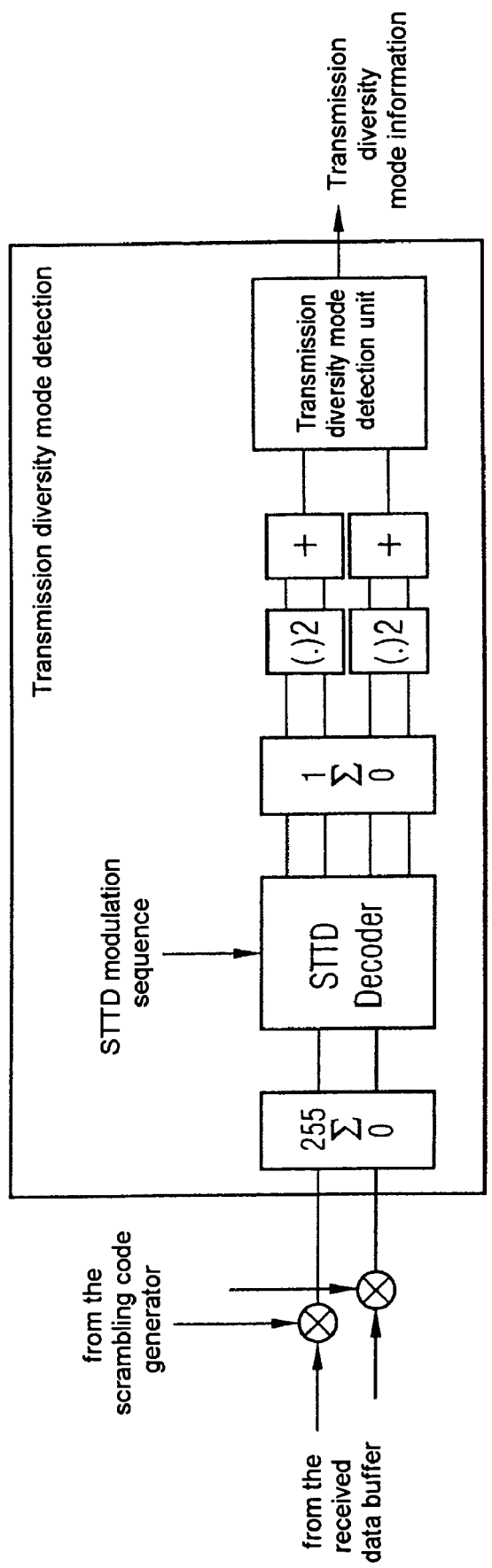
FIG. 4 shows a block diagram of an apparatus for detection of the transmission diversity mode according to the prior art.

The exemplary embodiment (which will be described in more detail in the following text) of a method according to the invention builds on the method that is known from the prior art and which was cited above in paragraph C). The following exemplary embodiment of the method according to the invention is, however, more robust with respect to frequency errors, while at the same time allowing very short detection times. Furthermore, the scrambling code identification is an integral component of the method according to this exemplary embodiment.

FIG. 1 shows an outline block diagram of one exemplary embodiment of the method according to the invention.

In contrast to the method of this generic type which has been described further above and is known from the prior art, not just one but in each case two successive data tuples $\{r(k); r(k+1)\}$; $\{r(k+2); r(k+3)\}$, where k=4n, are processed coherently in the exemplary embodiment of the method according to the invention, with each individual tuple being calculated in a first processing stage on the basis of the method which has been described above and is known per se. The aim is to identify and to correct the projections, that is to say errors, caused by the phase shift. This can be achieved efficiently using specific characteristics of received training sequences, in this case explained using the example of the CPICH-STTD modulation sequence. Corresponding exemplary embodiments relating to a method by means of identification and a method by means of correction of the projection error will be quoted at a later point. On the basis of Equation 2 and Equation 3, it follows for the two tuples that:

Antenna 1:

$$r_1^{(1)}(k) = r(k) \cdot A_k^{(1)} s^*(k) + r(k+1) \cdot A_{k+1}^{(1)} s^*(k+1) + n_1(k)$$
$$= (A_k^{(1)} \sigma_{s1}^2 + A_k^{(2)} \sigma_{s2}^2) A_k^{(1)} + (A_{k+1}^{(1)} \sigma_{s1}^2 + A_{k+1}^{(2)} \sigma_{s2}^2) A_{k+1}^{(1)} + n_1(k)$$

$$r_2^{(1)}(k) = r(k+2) \cdot A_{k+2}^{(1)} s^*(k+2) + r(k+3) \cdot A_{k+3}^{(1)} s^*(k+3) + n_2(k)$$
$$= (A_{k+2}^{(1)} \sigma_{s1}^2 + A_{k+2}^{(2)} \sigma_{s2}^2) A_{k+2}^{(1)} + (A_{k+3}^{(1)} \sigma_{s1}^2 + A_{k+3}^{(2)} \sigma_{s2}^2) A_{k+3}^{(1)} + n_2(k)$$

and, taking account of the characteristics of the sequences $A_n^{(1)}$ and $A_n^{(2)}$:

$$r_1^{(1)}(k) = 2|A|^2 \sigma_{s1}^2 + 0 \sigma_{s2}^2 + n_1(k) \quad \text{Equation 6}$$
$$r_2^{(1)}(k) = 2|A|^2 \sigma_{s1}^2 + 0 \sigma_{s2}^2 + n_2(k)$$

Antenna 2:

$$r_1^{(2)}(k) = r(k) \cdot A_k^{(2)} s^*(k) + r(k+1) \cdot A_{k+1}^{(2)} s^*(k+1) + n_1(k)$$
$$= (A_k^{(1)} \sigma_{s1}^2 + A_k^{(2)} \sigma_{s2}^2) A_k^{(2)} + (A_{k+1}^{(1)} \sigma_{s1}^2 + A_{k+1}^{(2)} \sigma_{s2}^2) A_{k+1}^{(2)} + n_1(k)$$

$$r_2^{(2)}(k) = r(k+2) \cdot A_{k+2}^{(2)} s^*(k+2) + r(k+3) \cdot A_{k+3}^{(2)} s^*(k+3) + n_2(k)$$
$$= (A_{k+2}^{(1)} \sigma_{s1}^2 + A_{k+2}^{(2)} \sigma_{s2}^2) A_{k+2}^{(2)} + (A_{k+3}^{(1)} \sigma_{s1}^2 + A_{k+3}^{(2)} \sigma_{s2}^2) A_{k+3}^{(2)} + n_2(k)$$

and, taking account of the characteristics of the sequences $A_n^{(1)}$ and $A_n^{(2)}$ $$r_1^{(2)}(k) = 0 \sigma_{s1}^2 + 2|A|^2 \sigma_{s2}^2 + n_1(k) \quad \text{Equation 7}$$
$$r_2^{(2)}(k) = 0 \sigma_{s1}^2 + 2|A|^2 \sigma_{s2}^2 + n_2(k)$$

Note: in the situation where no transmission diversity mode is being used, then $\sigma_{s2}^2 = 0$.

It is evident that, in the situation where the frequency errors are negligibly small, this approach achieves the same performance as that of the standard solution described further above with reference to the prior art. The exemplary embodiment of the method according to the invention will now be considered taking into account a frequency error. The decision functions $y^{(1)}$ and $y^{(2)}$ are now respectively functions in $f\{r_1^{(1)}(k); r_2^{(1)}(k)\}$ and $f\{r_1^{(2)}(k); r_2^{(2)}(k)\}$. On the assumption of a phase shift of $\Delta\phi$ between the received images of s(k) and s(k+1) as well as s(k+2) and s(k+3), this results in a phase shift of $2\Delta\phi$ between the two tuples $\{r(k); r(k+1)\}$ and $\{r(k+2); r(k+3)\}$. For simplicity, only the influence of the antenna 1 will be considered for the further analyses (this is the situation when no STTD-modulated signal is being emitted via the antenna 2). Extension to the antenna 2 is trivial, and will not be described in detail here. It thus follows, for the individual components, that:

1st tuple:

$$r_1^{(1)} = |A|^2 \sigma_{s1}^2 [(1+\cos\Delta\phi) + j\sin\Delta\phi] + n_1(k)$$

$$r_1^{(2)} = |A|^2 \sigma_{s1}^2 [(1-\cos\Delta\phi) - j\sin\Delta\phi] + n_1(k) \quad \text{Equation 8}$$

2nd tuple:

$$r_2^{(1)} = |A|^2 \sigma_{s1}^2 [(1+\cos\Delta\phi) + j\sin\Delta\phi] \cdot \underbrace{e^{j2\Delta\phi}}_{\text{phase between the two tuples}} + n_2(k)$$

$$r_2^{(2)} = |A|^2 \sigma_{s1}^2 [(-1+\cos\Delta\phi) + j\sin\Delta\phi] \cdot \underbrace{e^{j2\Delta\phi}}_{\text{phase between the two tuples}} + n_2(k)$$

$$= |A|^2 \sigma_{s1}^2 [(1-\cos(\Delta\phi+\pi)) - j\sin(\Delta\phi+\pi)] \cdot e^{j2\Delta\phi} + n_2(k)$$

Equation 9

Figure 5:
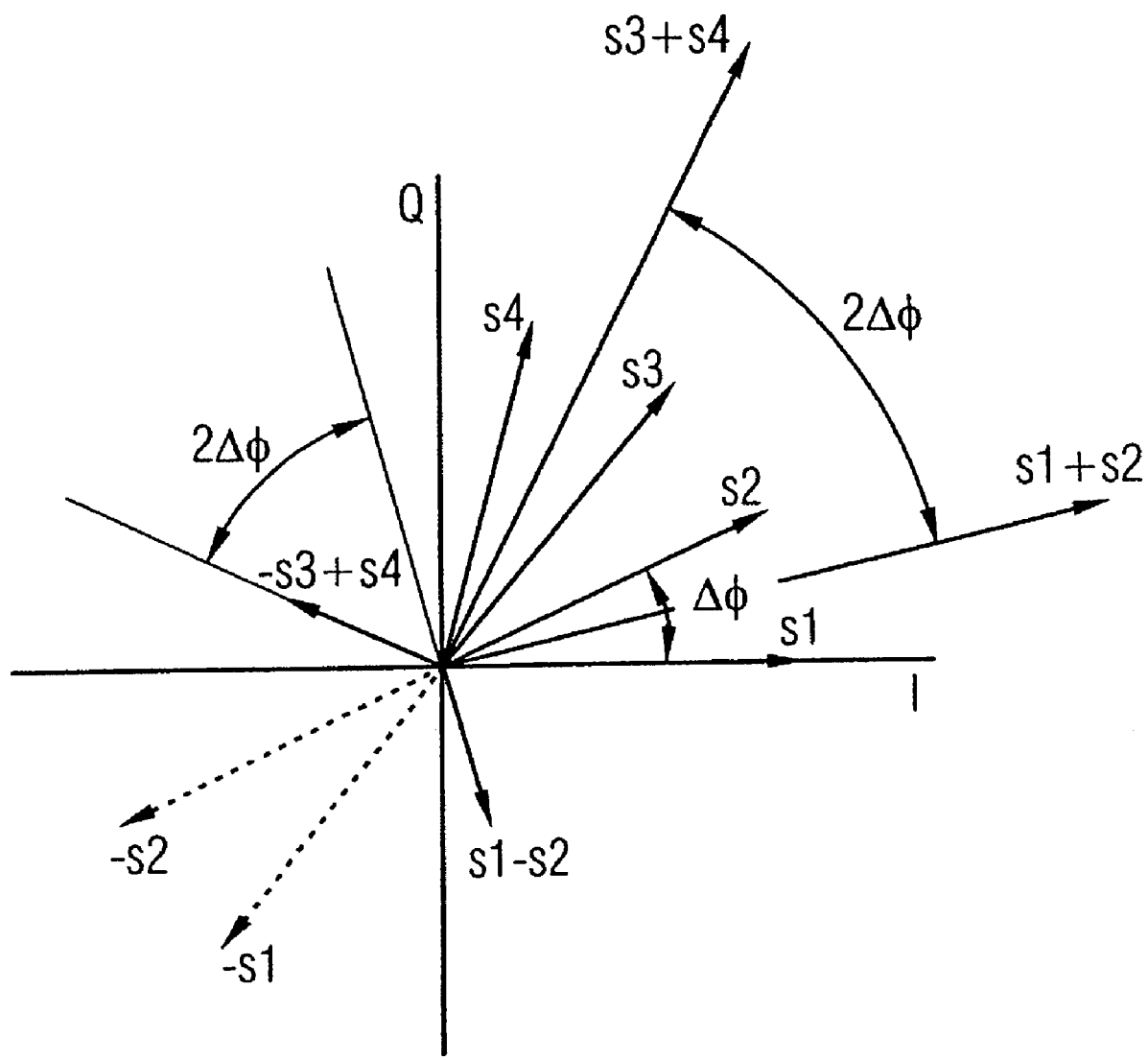
FIG. 5 shows a vector diagram relating to one exemplary embodiment of a method according to the invention in order to illustrate the useful and projection components which result from the phase error (in this case indicated only for antenna 1)
Figure 6:
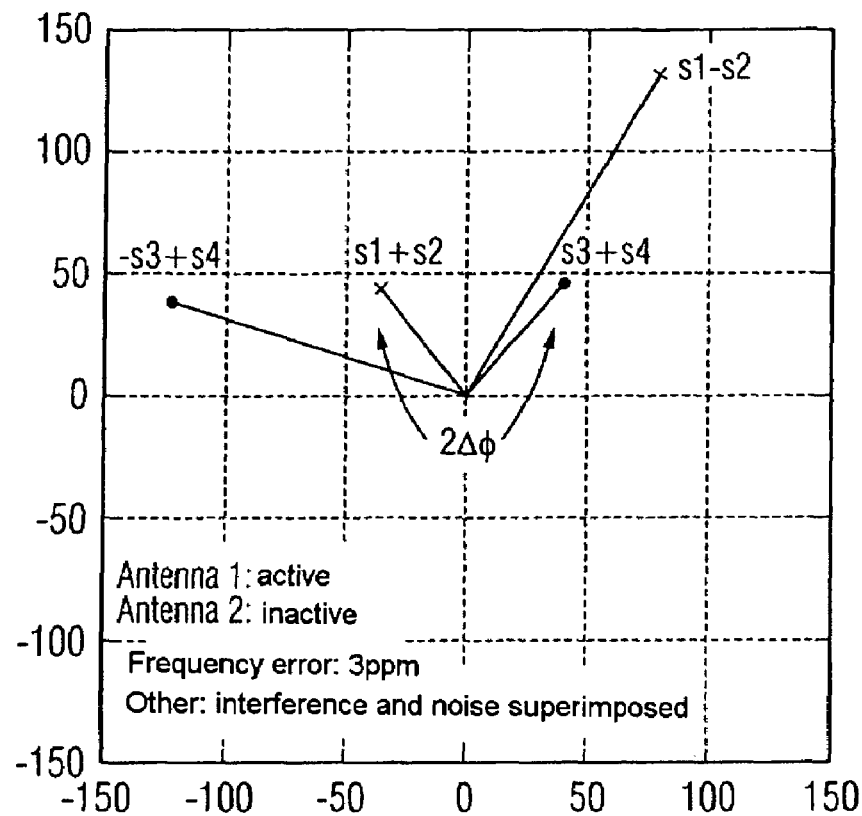
FIGS. 6 to 11 show diagrams for further exemplary embodiments of a method according to the invention in order to illustrate the useful and projection components which result from the frequency error.
Figure 7:
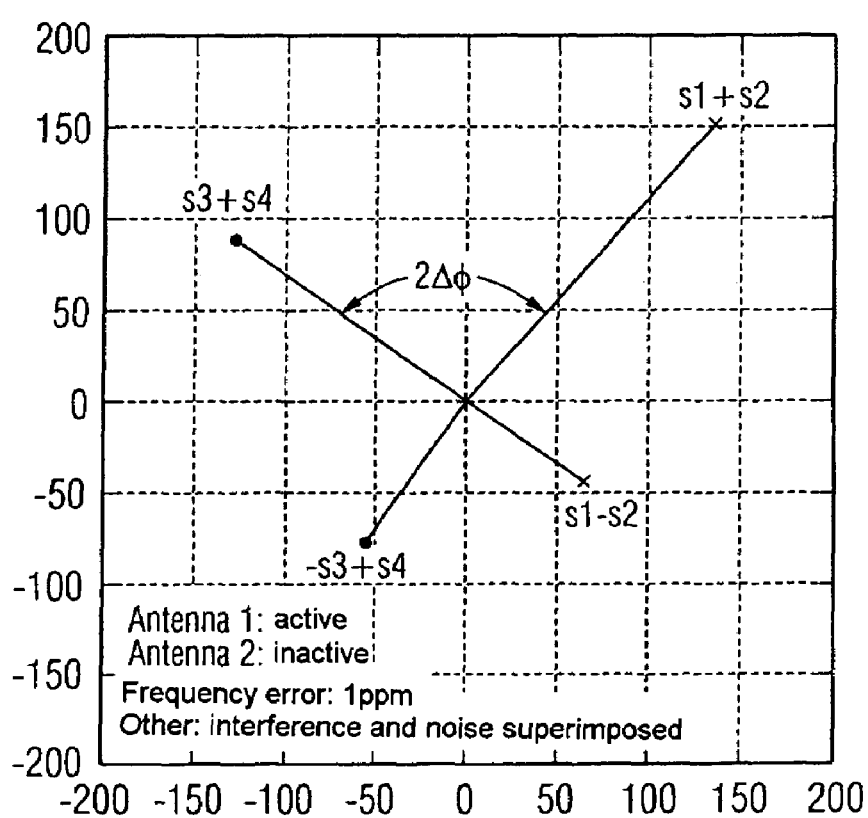
Figure 8:
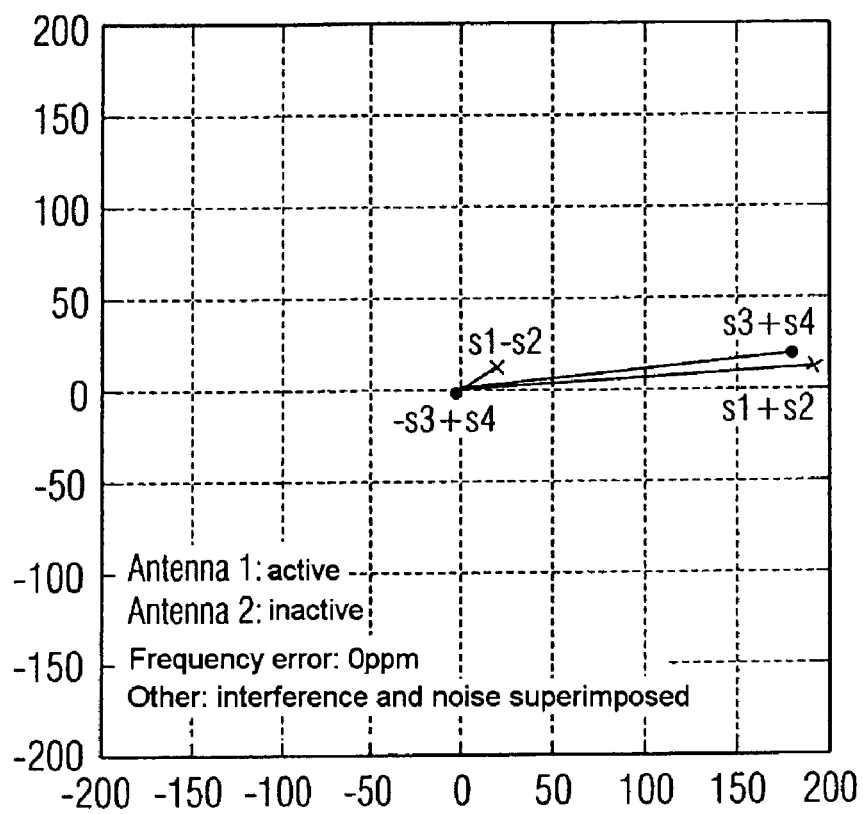
Figure 9:
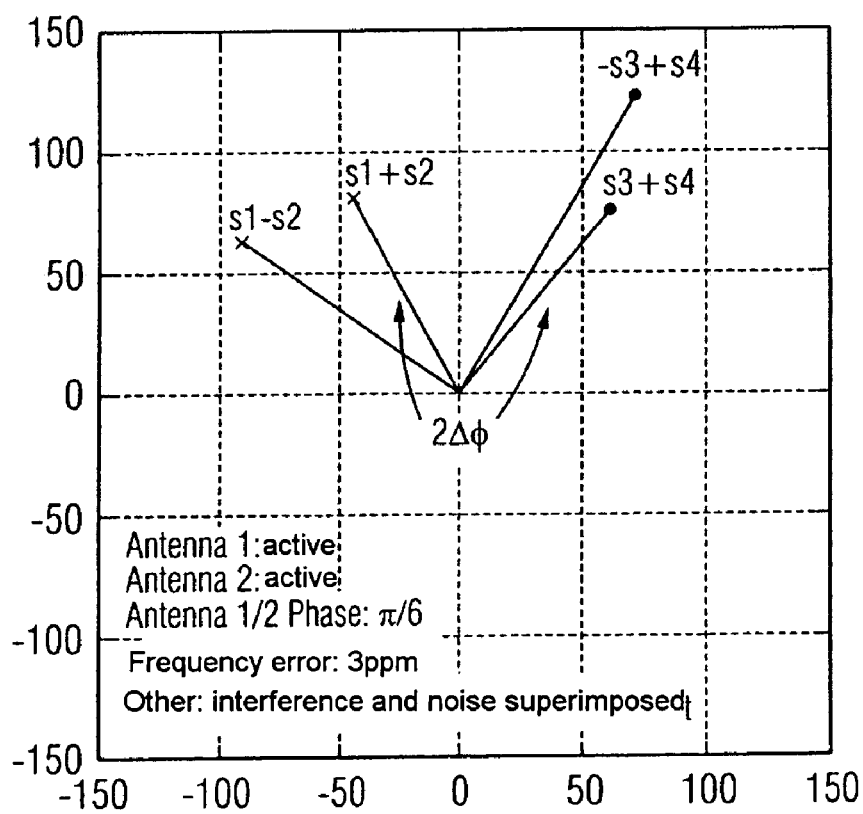
Figure 10:
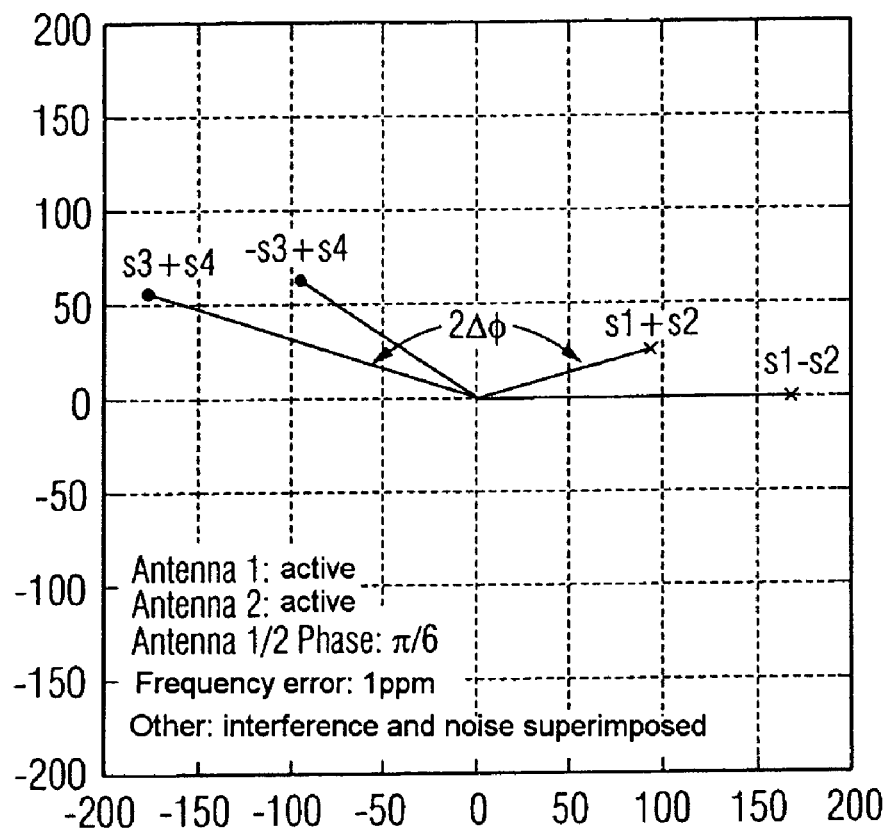
Figure 11:
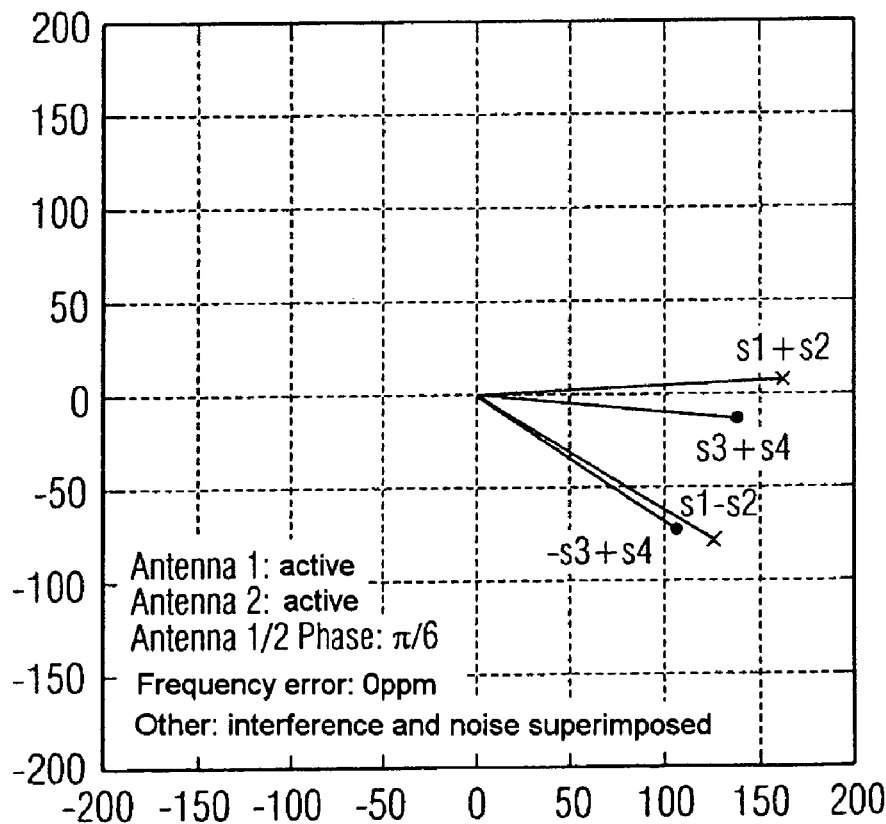

As is evident from Equation 8 and Equation 9, the error contributions caused by the frequency error (projections of antenna 1 onto antenna 2—results $r_1^{(2)}$ and $r_2^{(2)}$) are phase-shifted precisely by the factor $\pi$ owing to the code characteristics of the STTD sequence used (for example {A, −A, −A, A}). Furthermore, the result values for the second tuple are subject to a phase shift of $2\Delta\phi$ with respect to those of the first tuple, although said phase shift can easily be estimated by means of a suitable apparatus. FIG. 5 uses an appropriate vector diagram relating to the situation to once again show, in graphical form, the situation where $r_1^{(1)}$=s1+s2, $r_2^{(1)}$=s3+s4, $r_1^{(2)}$=s1−s2 and $r_2^{(2)}$=−s3+s4. This figure shows a vector diagram relating to the described exemplary embodiment of the method according to the invention in order to illustrate the useful and projection components which result from the frequency error (in this case indicated only for the antenna 1). Further diagrams for different scenarios, for example two antennas with 1 ppm, are shown in the FIGS. 6 to 11.

The complex result values $r_1^{(1)}$, $r_2^{(1)}$, $r_1^{(2)}$ and $r_2^{(2)}$ are now passed to a decision apparatus (second processing stage), which detects both the transmission diversity mode and the scrambling code being used, using suitable criteria.

Detection of the transmission diversity mode:

In the simplest case, an evaluation of the angle relationship between the antenna 1 and antenna 2 signal contributions of the individual tuples can be used here as a decision function. This results in the following algorithm (detection algorithm A):

I) $y_1$=sig{arg $r_1^{(1)}$−arg $r_a^{(2)}$} and $y_2$=sig{arg $r_2^{(1)}$−arg $r_2^{(2)}$}

II) if ($y_1$=$y_2$) then <TX-Diversity active> else <TX-Diversity inactive>

A further possible detection approach (Detection algorithm B) is based on the estimation of the phase shift $\Delta\phi$ and phase correction of the result values of the second tuple {r(k+2);r(k+3)}. A decision on the transmission diversity mode can be made by coherent addition of the phase-corrected tuple pair and subsequent comparison of the results values (preferably the magnitudes) $r^{(1)}$, $r^{(2)}$ with a well-defined threshold value. This results in the following algorithm (detection algorithm B):

I) $\Delta\phi = \dfrac{\arg r_2^{(1)} - \arg r_1^{(1)}}{2}$

II) $\hat{r}_2^{(1)} = r_2^{(1)} e^{-j2\Delta\phi}$ and $\hat{r}_2^{(2)} = r_2^{(2)} e^{-j2\Delta\phi}$ III) $y^{(1)} = r_1^{(1)} + \hat{r}_2^{(1)}$ and $y^{(2)} = r_1^{(2)} + \hat{r}_2^{(2)}$ IV) if ($y^{(1)} \geq$threshold value & $y^{(2)} \geq$threshold value) then <TX-Diversity active> else {if ($y^{(1)} \geq$threshold value ∥ $y^{(2)} >$ threshold value) then <TX-Diversity inactive> else <no decision possible>}

Furthermore, the statement can be optimized as follows:

Since the projection of antenna 1 components onto antenna 2 results is negligible for very small frequency errors, and thus $r_1^{(2)}$ and $r_2^{(2)}$ tend to include noise-dominant components, account is also taken of the fact that an appropriate detection algorithm is initiated only when the magnitudes $r_1^{(2)}$ and/or $r_2^{(2)}$ exceed a specific threshold value. Otherwise, a <TX-Diversity inactive> decision is made. One algorithm example is as follows:

I) abs_value=$|r_1^{(2)}|+|r_2^{(2)}|$

II) if (abs$_{13}$ value≧threshold value) then <start detection algorithm> else <TX-Diversity inactive>

Identification of the scrambling code being used:

The scrambling code identification is a fixed component of a three-stage synchronization procedure for 3rd generation mobile terminals, for example based on the 3GPP UMTS Standard, and this synchronization procedure is described, inter alia, in the following two documents: Zoch, A.; Fettweis, G. P.: Cell Search Performance Analysis for W-CDMA.—In: International Conference on Communications (ICC 2002), New York City, USA, Apr. 28 to Mar. 2, 2002; Holma H.; Toskala, A.: WCDMA for UMTS, John Wiley & Sons, Ltd., Chinchester, England, June 2000.

In the method proposed here, the result values (for example after the first stage) which are produced by the transmission diversity mode detection unit are likewise used for identification of the scrambling code being used, by means of a suitable scrambling code identification unit. If i denotes the scrambling code index used for production of the result values $r_1^{(1)}$, $r_2^{(1)}$, $r_1^2$ and $r_2^{(2)}$, this results in the following algorithm:

I) start <processing of the scrambling code i>

II) abs_value (i)=$|r_1^{(1)}|+|r_2^{(1)}|+|r_1^{(2)}|+|r_2^{(2)}|$

III) if (abs_value (i)>abs_value (i−1) then <current scrambling code=i>

IV) i++

One implementation example of an apparatus/architecture according to the invention in which the proposed method is used will be described in the following text.

Figure 12:
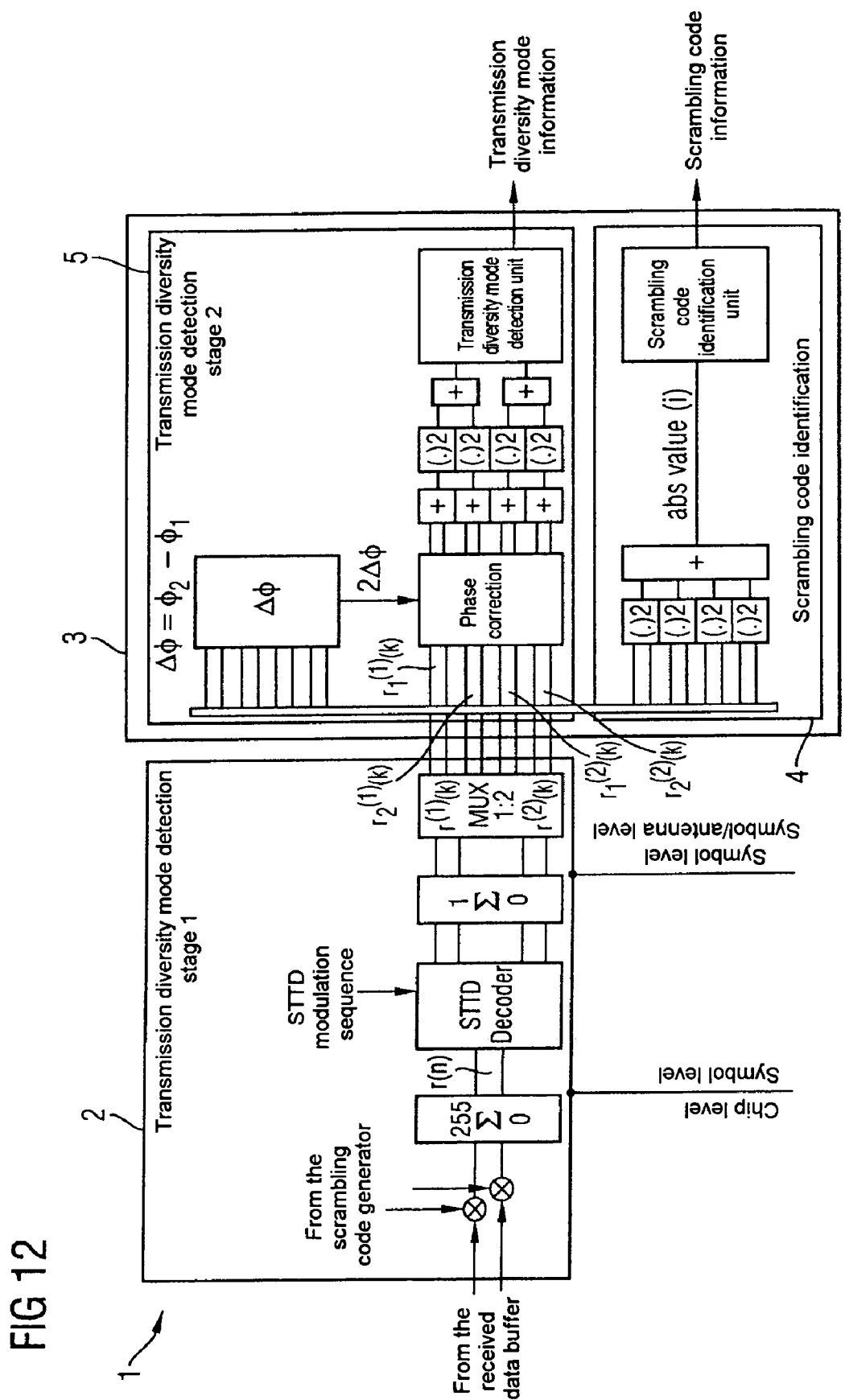
FIG. 12 shows one exemplary embodiment of an apparatus according to the invention for efficient transmission diversity

FIG. 12 shows this exemplary embodiment of an apparatus 1 according to the invention for efficient transmission diversity mode detection with parallel scrambling code identification.

The exemplary embodiment of an apparatus according to the invention as illustrated in FIG. 12 is designed such that it detects the transmission diversity mode using a decision function. In this case, it processes two successive input signal data tuples {r(k);r(k+1)} and {r(k+2);r(k+3)} coherently, carries out a phase correction for any phase offset between the two tuples, and on this basis produces the decision function that is used for detection of the transmission diversity mode. Details relating to this have already been explained further above with reference to an exemplary embodiment of a method according to the invention.

The exemplary embodiment of the apparatus 1 according to the invention as shown in FIG. 12 has two series stages 2, 3, the first stage 2 of which is used as the first stage of the transmission diversity mode detection process. The second stage 3 has two parallel subunits 4, 5, specifically a second transmission diversity mode detection stage 5 and, in parallel with it, a processing stage 4 for scrambling code identification. The first transmission diversity mode detection stage 2 is designed such that it digitally processes the received data and makes result values relating to the antenna 1 and the antenna 2 available to the downstream processing stages 3, that is to say both to the second transmission diversity mode detection stage 5 and, at the same time, to the scrambling code identification stage 4. The second transmission diversity mode detection stage 5 is designed such that it estimates the phase angle between the antenna components of the result values for each tuple, and evaluates the mathematical sign. In another exemplary embodiment of an apparatus according to the invention, the second transmission diversity mode detection stage 5 is designed such that it estimates and corrects the phase angle between the tuple pairs, and carries out coherent accumulation of this corrected tuple pair.

In summary, important aspects of the described exemplary embodiment of the method according to the invention will be mentioned once again in the following text:

a) The production of the decision function which is used for detection of the transmission diversity mode is based on the coherent processing of two successive input signal data tuples {r(k);r(k+1)} and {r(k+2);r(k+3)}. During this process, a phase correction is carried out for any phase offset, which is in general present, between the two tuples. Consideration of two successive input signal tuples makes it possible to correct detection errors which are caused by a frequency error which may be present.

b) The detection of the transmission diversity mode is carried out in two series stages, in which:

→the first stage digitally processes the received data and makes result values relating to the antenna 1 and the antenna 2 available to the downstream processing stages.

→the second stage estimates the mathematical sign of the phase angle between the antenna components of the result values for each tuple, or estimates and corrects the phase angle between the tuple pairs and carries out coherent accumulation of this corrected tuple pair.

c) The identification of the scrambling code being used is carried out in parallel with the detection of the transmission diversity mode, with the results from the first processing stage being fed at the same time into a suitable processing apparatus for identification of the scrambling code, or the scrambling code identification being carried out on the basis of the antenna signals directly in the transmission mode block 5.

The advantages of the exemplary embodiment of the method according to the invention as described above over known methods according to the prior art can be stated to be as follows:

a) The detection of the transmission diversity mode does not require any additional processing time since it is an integral component of the three-stage synchronization procedure.

b) The method according to the invention is very robust with respect to frequency errors, and there is therefore no need for prior fine frequency synchronization by means of AFC and/or channel estimation.

c) Only a very small amount of additional complexity is required since, for example, stage 1 of the detection apparatus for the transmission diversity mode can be mapped onto already existing hardware blocks (for example a single code finger of the rake receiver) and is required in any case for scrambling code identification.

We claim:

1. A method for blind detection of a transmission diversity mode in a mobile radio receiver, wherein a radio transmission from a transmission end in the transmission diversity mode is carried out with spatial diversity by two antennas, said method comprising:

coherent processing of two successively received input signal data tuples {r(k);r(k+1)} and {r(k+2);r(k+3)} of a pilot sequence; and calculating a phase offset between the two successive input signal data tuples {r(k);r(k+1)} and {r(k+2);r(k+3)}, wherein the first input signal data tuple {r(k);r(k+1)} comprises two successively received complex data samples r(k) and r(k+1) relating to a sampling time k and a sampling time k+1, respectively, and wherein the second input signal data tuple {r(k+2);r(k+3)} comprises two successively received complex data samples r(k+2) and r(k+3) relating to a sampling time k+2 and a sampling time k+3, respectively.

2. The method as claimed in claim 1, wherein the detection of the transmission diversity mode is executed in two series stages,
wherein the first stage is configured to digitally process the received complex data samples and to generate signal components from the individual antennas available to the downstream processing stages, and
wherein the second stage is configured to:
evaluate a characteristic variable of a phase angle between the signal components from each of the individual antennas for each tuple, or
estimate and correct the phase angle between the signal component of a specific antenna with respect to the first tuple and the signal component of the same antenna with respect to the second tuple, and determine whether a transmission diversity mode is present based on the phase-corrected tuple pairs.

3. The method as claimed in claim 2, wherein signal components are concurrently input into both the second stage and into a processing device configured to identify the scrambling code.

4. The method as claimed in claim 2, wherein the characteristic variable is a mathematical sign.

5. The method as claimed in claim 2, wherein the first stage is executed on one finger of a rake receiver.

6. The method as claimed in claim 1, wherein sequences of a pilot channel, which is known as CPICH in accordance with the UMTS-3GPP Standard, are used as pilot sequences, wherein the sequences are coded for transmission diversity using a UMTS-3GPP-specific STTD code.

7. A method for blind detection of a transmission diversity mode in a mobile radio receiver, wherein a radio transmission from a transmission end in the transmission diversity mode is carried out with spatial diversity by two antennas, said method comprising:
coherent processing of two successively received input signal data tuples {r(k);r(k+1)} and {r(k+2);r(k+3)} of a pilot sequence;
digitally preprocessing the successively received input signal data tuples to detect the transmission diversity mode; and
further processing in parallel the preprocessed resultant data to identify a scrambling code that is used for radio transmission and to detect the transmission diversity mode,
wherein the first input signal data tuple {r(k);r(k+1)} comprises two successively received complex data samples r(k) and r(k+1) relating to a sampling time k and a sampling time k+1, respectively, and wherein the second input signal data tuple {r(k+2);r(k+3)} comprises two successively received complex data samples r(k+2) and r(k+3) relating to a sampling time k+2 and a sampling time k+3, respectively.

8. A method for blind detection of a transmission diversity mode, wherein a radio transmission from a transmission end in the transmission diversity mode is executed with spatial diversity by two antennas, and for scrambling code identification in a mobile radio receiver by received pilot sequences, the method comprising:
digitally preprocessing a received input signal data to detect the transmission diversity mode; and
further processing in parallel the preprocessed resultant data to identify a scrambling code that is used for the radio transmission and to detect the transmission diversity mode.

9. The method as claimed in claim 8, wherein the preprocessing step further comprises:
coherent processing of two successively received input signal data tuples of a pilot sequence, wherein the first input signal data tuple comprises two successively received complex data samples relating to their sampling times, respectively, and the second input signal data tuple comprises two further successively received complex data samples relating to their sampling times, respectively; and
calculating a phase offset between the two successively received input signal data tuples.

10. The method as claimed in claim 9, wherein the detection of the transmission diversity mode is executed in two series stages,
wherein the first stage is configured to digitally process the received complex data samples and to generate signal components from the individual antennas available to the downstream processing stages, and
wherein the second stage is configured to:
evaluate a characteristic variable of a phase angle between the signal components from each of the individual antennas for each tuple, or
estimate and correct the phase angle between the signal component of a specific antenna with respect to the first tuple and the signal component of the same antenna with respect to the second tuple, and determine whether a transmission diversity mode is present based on the phase-corrected tuple pairs.

11. The method as claimed in claim 10, wherein signal components are concurrently input into both the second stage and into a processing device configured to identify the scrambling code.

12. The method as claimed in claim 11, wherein the characteristic variable is a mathematical sign.

13. The method as claimed in claim 11, wherein the first stage is executed on one finger of a rake receiver.

14. The method as claimed in claim 8, wherein sequences of a pilot channel which is known as CPICH in accordance with the UMTS-3GPP Standard, are used as pilot sequences, wherein the sequences are coded for transmission diversity using a UMTS-3GPP-specific STTD code.

15. An apparatus for blind detection of the presence of a transmission diversity mode in a mobile radio receiver, wherein a radio transmission at a transmission end in the transmission diversity mode is executed with spatial diversity by means of two antennas, said apparatus comprising:
a first stage configured to digitally process two successively received input signal data tuples;
a first processing stage configured to receive resultant data from the first stage and configured to identify the scrambling code that is used for radio transmission; and
a second processing stage configured to receive resultant data from the first stage and configured to detect the transmission diversity mode,
wherein the first input signal data tuple {r(k);r(k+1)} comprises two successively received complex data samples r(k) and r(k+1) relating to a sampling time k and to a sampling time k+1, respectively, and the second input signal data tuple {r(k+2);r(k+3)} comprises two successively received complex data samples r(k+2) and r(k+3) relating to a sampling time k+2 and a sampling time k+3, respectively.

16. An apparatus for blind detection of the presence of a transmission diversity mode in a mobile radio receiver, wherein a radio transmission at a transmission end in the transmission diversity mode is executed with spatial diversity by means of two antennas, said apparatus comprising:
- a first stage configured to digitally process two successively received complex data tuples and configured to generate signal components of the individual antennas; and
- a second stage configured to:
  - evaluate a characteristic variable of a phase angle between the signal components of each of the individual antennas for each tuple, or
  - estimate and correct the phase angle between the signal component of a specific antenna with respect to the first tuple and the signal component of that antenna with respect to the second tuple, and determine whether a transmission diversity mode is present based on the phase-corrected tuple pairs,
- wherein the first input signal data tuple $\{r(k); r(k+1)\}$ comprises two successively received complex data samples $r(k)$ and $r(k+1)$ relating to a sampling time k and to a sampling time k+1, respectively, and the second input signal data tuple $\{r(k+2); r(k+3)\}$ comprises two successively received complex data samples $r(k+2)$ and $r(k+3)$ relating to a sampling time k+2 and a sampling time k+3, respectively.

17. The apparatus as claimed in claim 16, wherein the results of the first transmission diversity mode detection stage are concurrently input into both a second transmission diversity mode detection stage and into a first processing device configured to identify the scrambling code, wherein the second stage comprises both the second transmission diversity mode detection stage and the processing device.

18. The apparatus as claimed in claim 16, wherein the characteristic variable is a mathematical sign.

19. The apparatus as claimed in claim 16, wherein the first stage is executed on one finger of a rake receiver.

20. An apparatus for blind detection of the presence of a transmission diversity mode in a mobile radio receiver, wherein a radio transmission at a transmission end in the transmission diversity mode is executed with spatial diversity by means of two antennas, said apparatus comprising:
- means for coherently processing two successively received input signal data tuples $\{r(k); r(k+1)\}$ and $\{r(k+2); r(k+3)\}$ of a pilot sequence;
- means for calculating the phase offset between the two successively received input signal data tuples $\{r(k); r(k+1)\}$ and $\{r(k+2); r(k+3)\}$; and
- means for determining whether a transmission diversity mode is present as a function of the phase offset,
- wherein the first input signal data tuple $\{r(k); r(k+1)\}$ comprises two successively received complex data samples $r(k)$ and $r(k+1)$ relating to a sampling time k and to a sampling time k+1, respectively, and the second input signal data tuple $\{r(k+2); r(k+3)\}$ comprises two successively received complex data samples $r(k+2)$ and $r(k+3)$ relating to a sampling time k+2 and a sampling time k+3, respectively.

21. The apparatus as claimed in claim 20, wherein sequences of a pilot channel, which is known as the CPICH, are used as pilot sequences in accordance with the UMTS-3GPP Standard, wherein the sequences are coded with a UMTS-3GPP-specific STTD code for transmission diversity.

22. A mobile radio receiver, characterized in that the receiver comprises an apparatus as claimed claim 20.

23. The mobile radio receiver as claimed in claim 22, wherein the receiver is a CDMA mobile radio receiver.

24. An apparatus for blind detection of the presence of a transmission diversity mode, wherein a radio transmission at a transmission end in the transmission diversity mode is executed with spatial diversity by two antennas, and for scrambling code identification in a mobile radio receiver by pilot sequences, comprising:
- a first stage configured to digitally preprocess two successively received input signal data tuples;
- a first processing stage configured to receive resultant data from the first stage and configured to identify the scrambling code that is used for the radio transmission; and
- a second processing stage configured to receive resultant data from the first stage and configured to detect the transmission diversity mode.

25. The apparatus as claimed in claim 24, further comprising:
- a means for coherently processing the two successively received input signal data tuples of the pilot sequence, wherein the first input signal data tuple comprises two successively received complex data samples relating to their respective sampling times, and the second input signal data tuple comprises two further successively received complex data samples relating to their respective sampling times;
- means for calculating the phase offset between the two successively received input signal data tuples; and
- means for detecting the transmission diversity mode, wherein the detection means determines whether a transmission diversity mode is present based on the output signal from the coherent processing means and as a function of the phase offset.

26. The apparatus as claimed in claim 25, further comprising:
- a first stage configured to digitally process the received complex data samples and to generate signal components of the individual antennas available for the first and second processing stages; and
- a second stage configured to:
  - evaluate a characteristic variable of a phase angle between the signal components of each of the individual antennas for each tuple, or
  - estimate and correct the phase angle between the signal component of a specific antenna with respect to the first tuple and the signal component of that antenna with respect to the second tuple, and determine whether a transmission diversity mode is present based on the phase-corrected tuple pairs.

27. The apparatus as claimed in claim 26, wherein the results of the first transmission diversity mode detection stage are concurrently input into both a second transmission diversity mode detection stage and into a first processing device configured to identify the scrambling code, wherein second series stage comprises both the second transmission diversity mode detection stage and the first processing device.

28. The apparatus as claimed in claim 26, wherein the characteristic variable is a mathematical sign.

29. The apparatus as claimed in claim 26, wherein the first stage is executed on one finger of a rake receiver.

30. The apparatus as claimed in claim 24, wherein sequences of a pilot channel, which is known as the CPICH, are used as pilot sequences in accordance with the UMTS-3GPP Standard, wherein the sequences are coded with a UMTS-3GPP-specific STTD code for transmission diversity.

31. A mobile radio receiver, characterized in that the receiver comprises an apparatus as claimed in claim 24.

32. The mobile radio receiver as claimed in claim 31, wherein the receiver is a CDMA mobile radio receiver.

* * * * *